United States Patent Office 3,661,806
Patented May 9, 1972

3,661,806
EXHAUST GAS OXIDATION CATALYST AND PROCESS
Warren S. Briggs and Frank G. Ciapetta, Silver Spring, Md., assignors to W. R. Grace & Co., New York, N.Y.
No Drawing. Continuation-in-part of application Ser. No. 707,395, Feb. 23, 1968, which is a continuation-in-part of application Ser. No. 418,402, Dec. 15, 1964, which in turn is a continuation-in-part of application Ser. No. 298,164, July 29, 1963. This application Jan. 5, 1970, Ser. No. 808
Int. Cl. B01j 11/16, 11/24
U.S. Cl. 252—470                                           3 Claims

ABSTRACT OF THE DISCLOSURE

Internal combustion engine exhaust gas oxidation catalyst and process of treating the exhaust gases to remove air pollutants. The catalyst comprises oxidation promoters dispersed upon a matrix. The catalyst possesses a specific pore volume distribution wherein 0.20 to 0.35 cc./g. of its pore volume are in pores having a diameter below 120 A., 0.10 to 0.25 cc./g. are in pores having a diameter between 120–3500 A. and 0.35 to 0.60 cc./g. are in pores having a pore diameter greater than 3500 A. The total pore volume of the catalyst is 0.65 to 1.20 cc./g. This catalyst has been found to possess an unusually long activity life.

---

This application is a continuation-in-part of application Ser. No. 707,395, filed Feb. 23, 1968, which is a continuation-in-part of application Ser. No. 418,402, filed Dec. 15, 1964, which is a continuation-in-part of Ser. No. 298,164, filed July 29, 1963, all now abandoned.

This invention relates to a novel method for treating exhaust vapors containing unburned fuel hydrocarbons and carbon monoxide. In one particular embodiment, this invention relates to a novel catalyst which is resistant to the poisoning effects of lead salts and other components found in the exhaust of internal combustion engines, is stable to the temperature effects normally encountered in a catalytic exhaust treating system and which has a potential useful life in excess of 20,000 miles.

The problem of air pollution has been the subject of considerable research in recent years. The various research groups have established a correlation between the presence of unburned fuel hydrocarbons in the atmosphere and the production of smog conditions with some certainty. Smog irritants which are deleterious to health and comfort are believed to be the result of a gaseous phase photochemical reaction in which unburned hydrocarbons and nitrogen oxides in the atmosphere are prime contributing factors. In the presence of sunlight photolysis of the oxides of nitrogen leads to the formation of measurable quantities of ozone. The ozone, in turn, reacts with various organic pollutants to form compounds which can cause many manifestations of smog such as eye irritation, visibility reduction, and plant damage.

The composition of the exhaust from internal combustion engines is characterized by the presence of unburned fuel hydrocarbons, both saturated and unsaturated, carbon monoxide and hydrogen. In addition to these noxious entities, the exhaust of internal combustion engines also contains measurable quantities of water vapor. A typical diesel exhaust also contains partial oxidation products such as organic acids, aldehydes and ketones. These materials may be present in some of the exhaust from other types of internal combustion engines but are typical of the exhaust of diesel motors.

In addition, the exhaust from internal combustion engines also frequently contains unburned carbonaceous solids. The exact composition of the exhaust from an internal combustion engine depends on engine type as well as engine load, speed, etc.

The problem of purifying exhaust, such as exhaust from automobiles, diesels and the like, is a very difficult and complex matter. It is not unusual for temperature in a catalytic converter to reach 1600° F. or higher. Thus, the exhaust treating catalytic muffler type device is subject to wide fluctuations in temperature over short periods of time. As a result the materials of the construction of the exhaust treating devices are prone to failure due to thermal stress. In addition to the mechanical difficulties due to these thermal stresses, a normal catalytic system cannot withstand prolonged exposure to the high temperatures frequently encountered in the systems without thermal degradation of the catalysts.

Even if the problem of thermal stability of the catalyst is successfully solved, the problem caused by the presence of oxides of lead, lead salts and particles of metallic lead still persists. This problem results from the use of tetraethyl lead and tetramethyl lead which are still the most commonly used gasoline anti-knock additive. In the preparation of gasoline, a quantity of tetraethyl lead and tetramethyl lead are added to the gasoline at the refinery to impart anti-knock properties to the fuel. In addition to the lead, a halogenated compound, usually a mixture of ethylene dibromide and ethylene dichloride is added with the lead compound to inhibit lead deposition on the wall of the engine cylinders. The lead products in the leaded gasoline are carried out in the exhaust gas in the form of finely divided solids principally lead halides, lead oxyhalides and other lead halide complexes of varying vapor pressure.

Thus, one of the principal mechanisms of catalytic deactivation in auto exhaust conversion catalysts is deposition of lead compounds.

The catalyst of our invention has a unique pore structure and distribution of small sized pores, intermediate sized pores, and larger sized pores which allows the large pores to adsorb the lead deposits while leaving the small pores free from lead deposits and clear from any overlapping of the lead deposits. The small diametered but high surface area and correspondingly very active, pores are thus free to contact, and catalyze the oxidation of, the exhaust gases. In particular our catalyst has a total pore volume of 0.65 to 1.20 cc./g. and a pore volume distribution whereby 0.20 to 0.35 cc./g. of the total pore volume is in very small pores having pore diameters below 120 A., 0.10 to 0.25 cc./g. of the pore volume is in intermediate sized pores having pore diameters between 120 A. and 3500 A., 0.35 to 0.60 of the pore volume is in pores having pore diameters above 3500 A. The largest pore diameter is not known with certainty, however, it is believed that the maximum pore diameter could run as high as 175,000 to 200,000 A.

The particular mechanism of our catalyst is not clearly known, however, it is believed that its operation and structure may be analyzed to a highway system of primary highways, secondary roads intersecting the highways and side streets intersecting the secondary roads, the secondary roads serving to keep the primary highway the side street separate and distinct. In analogy the large diameter pores are of course analogous with the primary highways and the small diameter pores with the side streets. Thus as the large pores absorb lead deposits any overlapping of the lead is taken up by the intermediate size pores thus leaving the small diameter pore unobstructed and free to contact the exhaust gases. Even though less pore volume is contained by the small pores than the larger pores the majority of the surface area and correspondingly the major portion of the activity will be contained within the small pores.

Our catalyst further has suitable activity in the presence of lead compounds, the ability to withstand high temperatures without the necessity of bypassing the exhaust at any period of the operation of the system, that will give satisfactory performance on the exhaust from lean and rich engines without the use of devices that add auxiliary oxygen at a point in the system where the gases are very hot, that gives satisfactory performance with a restricted amount of air and has a potential useful life greater than 20,000 miles or about 2 years time.

With the catalyst of this invention, the noxious components in an auto exhaust catalyst can be converted effectively and the catalytic activity of the catalyst maintained over a period in excess of 20,000 miles in the presence of lead contaminants in the exhaust by passing the exhaust gases into a suitable muffler and in contact with a catalyst active for hydrocarbons and carbon monoxide oxidation in which the catalyst has the following physical properties:

(1) A pore volume occurring predominantly (0.35 to 0.60 cc./g.) in the greater than 3500 A. pore size range.

(2) A substantial pore volume (0.20 to 0.35 cc./g.) in the less than 120 A. pore size range.

(3) A substantial, but less than the small pore, pore volume (0.10 to 0.25 cc./g.) in the 120–3500 A. pore size range.

(4) A total pore volume as measured by the methods referred to infra of from 0.65 to 1.20 cc./g.

Thus, we have found that it is critically important that the catalyst have a pore volume distribution in the proper range, that the mercury pore volume-nitrogen pore volume distribution fall in the proper range, and that a critical percentage of the pore volume of the catalyst fall within the micropore range if a catalyst with the proper thermal stability and stability to lead compounds is to be prepared.

The mercury pore volume is determined using the method described in Ritter, H. L., and Drake, L. C., Ind. Eng. Chem. Anal. Ed. 17, 787 (1945).

In this study, the total mercury pore volume was determined and the pore volume distribution calculated from a meausre of the volume of mercury in the various pore sizes in each of these catalysts. This was accomplished using a standard commercial mercury porosimeter. The operation of this system is dependent on the fact that mercury can be forced into different sized pores depending on the pressure exerted. Thus, at 100 p.s.i. absolute pressure, mercury can be forced into pores having a diameter of 17,500 angstroms and larger. As the size of the pores decreases, the amount of pressure required to force mercury into the pores increases. Thus, a mercury pressure of 10,000 p.s.i. is required to measure the volume of pores with a pore diameter of about 175 A. units. On the basis of a series of such measurements, the pore volume distribtuion over a certain pore diameter range was determined.

The nitrogen pore volume is measured by the techniques described in the article by S. Brunauer, P. Emmett and E. Teller, J. Am. Chem. Soc. 60, 309 (1938). This method depends on the condensation of nitrogen into the pores and is effective for measuring pores with a pore diameter in the range of 10 to about 600 A. units. The selective determination of nitrogen pore volume within a given pore size range was determined by using the Barrett, Joyner, and Halenda method described in J. Am. Chem. Soc. 73, 373 (1951).

The promoter may be dispersed on on the support matrix by conventional methods, for example, impregnation, precipitation or co-precipitation.

Although our invention will be described using the catalyst which utilizes copper oxide, palladium and chromia as the oxidizing components, catalysts having other oxidizing components such as metals and metal oxides of groups Ib, Va, VIa, VIIa and VIII of the Periodic Table and mixtures thereof, may be used. Suitable examples include $MnO_2$, CoO, MgO, $MoO_3$, $Fe_2O_3$, NiO, $V_2O_5$, Pt, etc. and mixtures thereof.

Very briefly, the process for preparing one of the preferred catalysts comprises selecting a suitable support and impregnating the support with a cuprous amine tartrate-palladium salt solution which is prepared from a mixture of the cuprous salt, tartaric acid, concentrated ammonium hydroxide (28% wt. $NH_3$) and a palladium salt solution. The mixture is made up to prepare a final catalyst containing up to about 2 to 20% CuO and about 0.0025 to about 0.1% palladium. The preferred palladium concentration is about 0.0025 to about 0.04 weight percent palladium in the final catalyst.

After the copper-palladium impregnation, the product is dried for a short period of time at about 260° F. The product is reimpregnated with a chromia solution to yield a final catalyst containing 1 to 10 weight percent $Cr_2O_3$. Suitable salts for the copper impregnation include any of the known cuprous salts, for example, cuprous bromide, cuprous chloride, cuprous cyanide, cuprous fluoride, cuprous sulfide, cuprous sulfite, cuprous cyanate, cuprous oxide, etc. Because of its ready availability and comparatively low cost, the preferred cuprous salt is cuprous chloride. After the cuprous amine tartrate has been prepared, a solution of palladium salt is added to the solution. Suitable palladium salts include palladium bromide, palladium chloride, palladium fluoride, palladium nitrate, palladium sulfate, etc. The chrome impregnation is the final impregnation step in the preparation of the catalyst. The chrome impregnation is made with a chromia solution. Suitable chromium salts for this impregnation include ammonium chromate $(NH_4)_2CrO_4$; chromic acid, $CrO_2 \cdot H_2O$; ammonium dichromate, $$(NH_4)_2Cr_2O_7$$

chromic acetate, 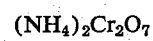 $Cr_2(C_2H_3O_2)_6 6H_2O$, etc. Following impregnation to the desired promoter level, the catalyst is dried in an oven usually at 220–280° F. for 3–16 hours. Activation is achieved by calcination to decompose the metal salt to the oxide or by reduction in hydrogen to give the reduced metal.

In order for the catalyst to have the desired porous properties, the selection of a material having a high surface area associated with a high pore volume is critically important. We have found that the materials with the proper pore size distribution are restricted almost exclusively to a certain group of aluminas. Other base materials such as silica gels, silica-alumina, silica-magnesia, silica-zirconia, alumina-boria, silica alumina magnesia, aluminum-phosphate gel, magnesia, acid activated clays and bauxite, may be used under certain conditions if the material is treated to give the proper pore size distribution in the final catalyst.

One method of forming a suitable support material (in this instance alumina gel) having the necessary pore size distribution is by reacting aqueous aluminum nitrate with ammonium hydroxide. Aqueous solutions of each of the reactants are brought into contact in a suitable reactor while being thoroughly mixed.

The aqueous aluminum nitrate solution must have a molarity of from 0.5 up to less than 1.6 and preferably from 1.0 up to less than 1.6. Aqueous ammonium hydroxide solutions having molarities of from 6 to 17 and preferably from 10 to 17 can be employed. The concentrations of each of these reactant solutions are critical to form the required pore distribution.

The aluminum nitrate is mixed with a quantity of the ammonium hydroxide solution sufficient to provide a constant pH within the narrow, critical range of from 5 up to about 8.5, and preferably from 5 to 8.3. Preferably, streams of each of the reactant solutions are continuously brought into contact with agitation at flow rates which provide a constant pH for the reaction mixture. If the reactant solutions are not mixed at such a rate that this narrow constant pH range is obtained, the product formed does not possess the desired porosity.

The temperature of the reactant solutions should be controlled such as the solutions form a reaction mixture having a temperature within the range of from 20 to 35° C.

The reaction mixture is then aged for from 0.1 to 48 hours and preferably 0.2 to 24 hours at a temperature within the range of from 20 to 35° C. The aging temperature is also critical. If the reaction product is aged at temperatures greater than 35° C. the porosity of the alumina product is impaired. If aging temperatures less than 20° C. are employed, problems arise due to the limited solubility of certain of the reaction products in the reaction mixture. Aging times longer than 24 hours provide no added beneficial effect and even slightly impair the pore volume of the alumina product.

The alumina is then separated from the reaction mixture by any suitable means, such as centrifugation, filtering, etc. and then washed. For the production of granular alumina, separation of the alumina by filtration is preferred.

The alumina is then dried and activated. The alumina can be dried to free it from surface moisture by heating it at temperatures up to 220° F. in a stream of dry gas or in a vacuum. Heating the alumina at temperatures greater than 150° F. during the drying step is preferred. Care should be taken to avoid heating the wet alumina in a moist atmosphere as it has been found that such a treatment impairs the porosity of the final product. The alumina is then activated to remove bound moisture and other volatile components. Activation of the alumina is obtained by heating the alumina to temperatures within the range of from 600 to 1600° F. and preferably at temperatures of from 1000 to 1500° F. Because of the high thermal stability of the alumina heating at temperatures in the upper ranges does not impair the pore structure of the product. The alumina is activated by heating at temperatures within the specified ranges until the removal of the bound moisture is substantially complete, for example from about 2 to 4 hours.

The product alumina has a pore volume of from 0.55 to 1.60 cc./g. with from 0.35 to 0.95 cc./g. of the pore volume being present in pores having diameters within the range of greater than 3500 A.

The above method of preparation is not of a part of our invention and further details of this method may be had by reference to the copending application Ser. No. 459,161, filed May 27, 1965, now abandoned.

A silica-alumina matrix of the correct pore size distribution, may be produced by conventional processes by varying (1) the concentrations of the reactants in the reaction solution or (2) the pH of the reaction and aging solutions or (3) the temperatures of the reaction and aging solutions or (4) aging time or (5) combinations of these variables. Necessarily trial and error adjustment of these variables will be required to determine the optimum conditions required to obtain our pore size distribution. A more complete description of this procedure may be found in an article by K. D. Ashely and W. B. Jones, entitled Control of Physical Structure of Silica-Alumina Catalyst, appearing on pages 2857–2863 of Industrial and Engineering Chemistry, vol. 44, No. 12, December 1952.

The new and unexpected results obtained when our catalyst is used in an auto exhaust conversion system was demonstrated using the standard procedure described in detail in California Procedure for Testing Motor Vehicle Exhaust Emissions, published by the Motor Vehicle Pollution Control Board in May 1961 as revised in January 1964.

Very briefly, this system consists of aging the catalyst by driving an automobile using leaded gasoline with a suitable muffler containing the catalyst and a suitable air supply, over the road for varying periods of time. The vehicle is brought in periodically (1000 to 2000 miles) and run through dynamometer tests described in the publication cited above.

The cycle used in the chassis dynamometer testing is a 7-mode cycle of 2-minutes and 17 seconds duration. The first four cycles constitute the warm-up period. The sixth and seventh cycles are the hot cycles. In each of these tests transition modes are included. Inlet and outlet emissions are measured before and after the catalytic converter in consecutive and continuous warm-up cycles followed by two hot cycles. This test is carried out starting with a cold engine which has not been operated for at least 12 hours. The duration of this test is 15 minutes and 59 seconds and is designed to be representative of an "average" trip in a metropolitan area from a cold engine start. Emissions of hydrocarbons, carbon monoxide and carbon dioxide are measured by non-dispersive infrared analysis throughout the test.

Data from each mode of the first four warm-up cycles and the two hot cycles are averaged, corrected for air dilution variations, and weighed to give single average values for hydrocarbons and carbon monoxide during the warm-up phase and during the hot cycle. A final "combined" value for the device is determined by combining 35% of the warm-up cycle emissions and 65% of the hot cycle emissions.

The performance of the catalyst was evaluated with the exhaust gases produced by a stationery internal combustion engine. The catalyst, in a suitable muffler, was placed in the exhaust stream of a single cylinder engine using commercial unleaded premium gasoline to which 3.0 cc. of tetraethyl lead per gallon of gasoline was added. The engine used in this test is a Palmer P.W. 27 water cooled single cylinder engine with a bore of 3.25 inches and a displacement of 27 inches. The engine was automatically controlled to operate continuously at cruising speed of 40 m.p.h. (1800 r.p.m.). A 660 cc. charge of catalyst was placed in the muffler which had a diameter of 3.25 inches with a total depth of 4.25 inches. The muffler was inserted in the exhaust line in such a manner that the muffler acted as a downflow reactor. All of the exhaust gases were passed through the catalyst bed. Secondary air was added to the exhaust gas prior to entering the converter. The hydrocarbon and carbon monoxide content of the exhaust gas, both on entering and leaving the converter, were measured periodically throughout the course of the test. Initial and final conversion of hydrocarbon and carbon monoxide in the exhaust gas was recorded.

The invention is further illustrated by the following specific but non-limiting examples.

Example I

This example shows how alumina compositions used as the support materials of our catalysts may be prepared.

A one molar aluminum nitrate solution was continuously mixed with a 17 molar ammonium hydroxide solution flow rates which gave reaction mixture pH of 6.0 in runs A and B and 8.3 in runs C and D. The reaction mixture was held in the reactor for 18.7 minutes, and was then continuously transferred to a reservoir. The reactants were continuously mixed for 160 minutes, and then immediately transferred from the mixing vessel, and filtered. The cake was washed on the filter with 2 liters of deionized water, using 2 washes. Part of the cake, samples A and C, was dried overnight at 150° F. in a forced draft oven, and another part of the cake, samples B and D, was dried at 220° F. in a vacuum oven until it was substantially free from surface moisture. Each portion of the filter cake was then broken into granules, and alumina granules having a size within the range of from 6 to 10 mesh were separated.

Each alumina sample was then tested to determine the pore size distribution and total pore volume. The pore volume characteristics of each of the alumina samples prepared in runs A, B, C and D are shown in Table A.

TABLE A
Pore volume distribution (cc./g.)

| Run No. | Pore size <120A. | 120 to 3,500 A. | >3,500 A. | Total |
|---|---|---|---|---|
| A | 0.31 | 0.34 | 0.41 | 1.06 |
| B | 0.43 | 0.34 | 0.41 | 1.09 |
| C | 0.34 | 0.15 | 0.51 | 1.00 |
| D | 0.30 | 0.08 | 0.49 | 0.87 |

The catalyst support materials set forth in Table A above were treated with solutions of $Cu_2Cl_2$ as amine tartrate plus solutions of $Pd(NO_3)_2$ and $(NH_4)_2CrO_4$ to yield catalyst having 10% CuO, 0.02% Pd and 4% $Cr_2O_3$. The following procedure was followed:

A copper amine tartrate solution was prepared by weighing 480 grams of cuprous chloride (CuCl) and 48 grams of tartaric acid. The cuprous chloride-tartaric acid mixture was added to a covered flask and 1120 ml. of concentrated ammonium hydroxide solution (28% $NH_3$) was added to the mixture with stirring for a period of about one hour. This formulation gave a cuprous amine tartrate solution which weighed 1515 grams and had a density of 1.235 grams per ml. Volume of this solution was 1225 ml. and contained 0.315 gram of cupric oxide (CuO) per ml. (calculated).

Prior to impregnation of the catalyst support, sufficient palladium as 10% palladium nitrate solution was added to the cuprous amine tartrate solution to yield a CuO to Pd weight ratio of 500 to 1.

In preparing the catalyst, samples of supports weighing 430 grams based on $Al_2O_3$ prepared as shown in Example I and tabulated in Table A were contacted with 159 ml. of the cuprous amine tartrate palladium solution which was then diluted with $H_2O$ to a total volume of 350 ml. This solution volume was sufficient to saturate the granules but leave the surface essentially dry. The impregnated base was then dried for 16 hours at 260° F. Composition of the material at this point was 430 g. $Al_2O_3$-50 g. copper calculated as CuO, and 0.1 g. palladium plus approximately 100 grams of ammonia, chloride, and tartaric acid or a total of 580 grams.

Chromia was added to the granules containing copper and palladium as follows:

The 580 grams of dried material described above were transferred to an open vessel and 250 ml. of a solution containing 40 g. of $(NH_4)_2CrO_4$ (20 g. $Cr_2O_3$) was added with mixing. The total mixture was transferred to a glass vessel which was equipped to release the steam generated slowly as the mixture was dried at 260° F. Following drying, the catalyst was heated to 1000° F. for three hours and finally calcined for 3 hours at 1400° F.

The above catalysts were determined to possess the pore volume distribution set forth in Table B.

TABLE B
Pore volume distribution (cc./g.)

| Catalyst support | Pore size <120 A. | 120 to 3,500 A. | >3,500 A. | Total |
|---|---|---|---|---|
| A plus B | 0.20 | 0.19 | 0.36 | 0.75 |
| C | 0.27 | 0.18 | 0.44 | 0.89 |
|  | 0.26 | 0.11 | 0.35 | 0.72 |

EXAMPLE II

Three catalysts having varying porosity characteristics were prepared using the impregnation techniques disclosed previously in Example I.

In this example catalysts were prepared by distending the active components, 10% copper oxide (CuO), 4% chromia ($Cr_2O_3$), 0.02% palladium (Pd) on high surface aluminas. The aluminas were impregnated with solutions of the respective components and the product dried and calcined for three hours at 1400° F. The pore characteristics of these catalysts are shown in the table below.

TABLE I
Pore volumes in cc./g. in various pore diameters

| Catalyst | Pore diameters >3,500 A. | 120 to 3,500 A. | <120 A. | Total |
|---|---|---|---|---|
| I | 0.04 | 0.34 | 0.08 | .46 |
| II | 0.00 | 0.54 | 0.21 | .75 |
| III | 0.54 | 0.16 | 0.26 | .96 |

Catalysts I and II represent prior art catalysts having conventional pore structure. Catalyst III represents our catalyst having the pore structure and pore distribution according to our invention.

EXAMPLE III

In this example, the catalysts impregnated according to the process of Example II were evaluated to determine their activity for hydrocarbon and carbon monoxide conversion.

These catalysts were evaluated by determining the percent conversion of a mixture containing 3.85% carbon monoxide, 1000 parts per million normal hexane, 10% water, and 4.5% oxygen, the balance being nitrogen. The exhaust gases were passed through the catalyst at a gaseous space velocity of 5000 volumes of gas per volume of catalyst per hour. The activity index of the catalyst for either carbon monoxide or hydrocarbon conversion was determined by measuring the area under an activity curve in the range of average catalyst temperature from 350 to 850° F. and then calculating what percentage of this area constitutes the area under the "ideal" activity curve. "Ideal" activity index may vary from 0, which indicates no activity to 100% which would indicate "ideal" activity.

The data collected in this series of runs is set out in the table below:

TABLE II.—ACTIVITY INDICES FOR CARBON MONOXIDE (CO) AND HYDROCARBON (HC)

After calcination 3 hours at 1,400° F.

| Catalyst number | I | II | III |
|---|---|---|---|
| CO | 97 | 93 | 95 |
| HC | 37 | 45 | 58 |

After calcination 16 hours at 1,400° F.

| CO | 83 | 81 | 78 |
| HC | 42 | 52 | 58 |

These data clearly demonstrate the improved activity associated with Catalyst III, the catalyst of the present invention. The improvement is most marked in the hydrocarbon conversion. The activity indices for the hydrocarbon conversion increased from 37 to 58 in the mild calcination and from 42 to 58 in the more severe calcination treatment of the catalyst.

EXAMPLE IV

Relative performance data for the three catalysts was collected in a single cylinder engine using the techniques described previously. In this series of runs, the catalysts (Catalysts I, II and III), prepared according to the techniques described in Example II, were placed in the muffler of a single cylinder engine. The engines were operated using a premium fuel containing 3 cc. of tetraethyl lead per gallon. The fuel contained 0.03 percent sulfur. Tricreysl phosphate (TCP) was added as a lead scavenger. The TCP was added in an amount sufficient to convert 20% of the lead present to the orthophosphate (0.2 theory). The data collected is tabulated in Table III. The conversion of hydrocarbon and carbon monoxide are shown separately as a function of hours of operation. This type of operation represents an average speed of 40 miles per hour or 4,000 miles per hundred hours of operation.

TABLE III
Percent conversion after 100 hours of operation

| Catalyst number | I | II | III |
|---|---|---|---|
| CO | 46 | 76 | 100 |
| HC | 46 | 72 | 92 |

These data show the superiority of the catalyst of the present invention (Catalyst III) as compared to Catalysts I and II in a single cylinder engine test. As can be seen from Table III, the hydrocarbon conversion and CO conversion in both Catalysts I and II were substantially below the conversion for the catalysts of this invention after 100 hours of operation. Data were not collected on the other two catalysts since they had substantially failed before the engine had been operated for a period of 200 hours.

EXAMPLE V

In this example, the catalysts were evaluated using a multi-cylinder engine and chassis dynamometer.

In this series of runs, nominal 450 cubic inch charges of the catalysts were contained in the catalytic mufflers. The catalysts were aged using a dynamometer stand engine. The engine was a 1963 Chevolet V-8 having 283 cubic inch capacity, loaded with a G.E. electric dynamometer. The dynamometer was programmed to run in a cyclic manner at different speeds. At periodic intervals the muffler was installed on an automobile having the same engine characteristics and using a chassis dynamometer in the California cycle described previously. This activity test used only secondary air injection, either by venturi or pump added prior to the muffler but not into the exhaust manifold. The data collected in this series of runs is shown in Table IV below.

TABLE IV.—CHASSIS DYNAMOMETER EVALUATION
Percent conversion with accumulated mileage after 2,000 miles

| Catalyst number | I | II | III |
|---|---|---|---|
| CO | 62 | 68 | 78 |
| HC | 52 | 62 | 60 |
| After 4,000 miles | | | |
| CO | 51 | 56 | 76 |
| HC | 40 | 47 | 58 |
| After 6,000 miles | | | |
| CO | 44 | 50 | 70 |
| HC | 35 | 38 | 56 |
| After 8,000 miles | | | |
| CO | 40 | 45 | 71 |
| HC | 24 | 38 | 55 |
| After 10,000 miles | | | |
| CO | 36 | 45 | 60 |
| HC | 19 | 36 | 56 |
| After 12,000 miles | | | |
| CO | 30 | 45 | 56 |
| HC | 16 | 33 | 52 |

It is apparent from review of these data that the catalyst of the present invention has a greatly improved stability, even though the auxiliary air is added just prior to the muffler. It is well known that adding the auxiliary air in the manifold oxidizes a portion of the exhaust gases before they enter the muffler, and facilitates the oxidation of the balance of the gases in the muffler. Addition of the air to the exhaust manifold is of limited usefulness in systems designed for use in used cars, for example, because of installation costs. The catalyst of the instant application thus provides a catalyst that will oxidize greater than 50% of the hydrocarbons and 56% of the carbon monoxide after 12,000 miles under adverse operating conditions.

EXAMPLE VI

A thermal stability study was made of the catalyst of the instant application (Catalyst III) as compared with Catalyst I of Example I. In this study, the catalysts were calcined at temperatures of 1400 to 1750° F. for 3 hours and the effect of this heat treatment on the hydrocarbon activity index was noted. The data collected in this series of runs is shown in Table V below:

TABLE V.—HYDROCARBON ACTIVITY INDEX OF CALCINED CATALYSTS

| Temperature in ° F. | Catalyst I | Catalyst III |
|---|---|---|
| 1,400 | 42 | 54 |
| 1,500 | 34 | 54 |
| 1,600 | 32 | 53 |
| 1,700 | 30 | 53 |
| 1,750 | 28 | 47 |

It is apparent from the examination of these data that the catalyst of the instant application is much more stable than the catalyst with a substantial percentage of the pores in the lower pore size range. There is essentially no change in the hydrocarbon activity index on calcination of the catalyst of the instant invention up to temperatures of 1750° F. The catalyst with the smaller pore size distribution underwent a continual decline in the hydrocarbon activity index over the range of 1400 to 1750° F.

The differences in activity and aging performance which have been shown in Examples I to V can be explained on the basis of the pore structure of the catalyst. The surface area of the finished catalyst is 65–130 m.$^2$/g. The only essentially difference between Catalysts I, II, and III is in the pore distribution, especially in the micro pore distribution range where there is a significant difference. These data show clearly that the catalyst of the present invention (Catalyst III) has a substantial percentage of the pores in the greater than 17,500 angstrom size range. Catalysts I and II do not have any appreciable distribution of pore volume above the 3500 angstrom size range.

Obviously many modifications and variations of the invention as hereinabove set forth may be made without departing from the essence and scope thereof and only such limitations should be applied as are indicated in the appended claims.

What we claim is:

1. A hydrocarbon oxidation catalyst consisting essentially of an alumina matrix and a hydrocarbon and carbon monoxide oxidation promoter selected from the group consisting of palladium, platinum, the oxides of copper, chromium manganese, magnesium, cobalt and mixtures thereof dispersed within said alumina matrix, said catalyst being characterized by a pore volume distribution of 0.20 to 0.35 cc. per gram in pores having a pore size less than 120 A., 0.10 to 0.25 cc. per gram in pores having a pore size between 120 to 3500 A., and 0.35 to 0.60 cc. per gram in pores having a pore size greater than 3500 A. and a combined mercury and nitrogen pore volume of 0.65 to 1.20 cc. per gram.

2. The catalyst of claim 1 wherein said promoters comprise a combination of copper oxide, chromium oxide, and palladium.

3. The catalyst of claim 2 which contains 2 to 20 weight percent copper oxide, 1 to 10 weight percent chromium oxide, and 0.0025 to 0.4 weight percent palladium.

References Cited

UNITED STATES PATENTS

| 3,288,558 | 11/1966 | Briggs et al. | 23—2 E |
| 3,392,125 | 7/1968 | Kelly et al. | 252—461 |
| 3,067,128 | 12/1962 | Kimberlin, Jr. et al. | 23—143 |
| 3,417,028 | 12/1968 | Montgomery et al. | 23—143 X |
| 3,112,995 | 12/1963 | Hoekstra | 23—143 |
| 3,322,494 | 5/1967 | Magee et al. | 23—143 |

OSCAR R. VERTIZ, Primary Examiner

G. O. PETERS, Assistant Examiner

U.S. Cl. X.R.

23—2 E; 252—472, 474, 476